United States Patent Office 3,415,527
Patented Dec. 10, 1968

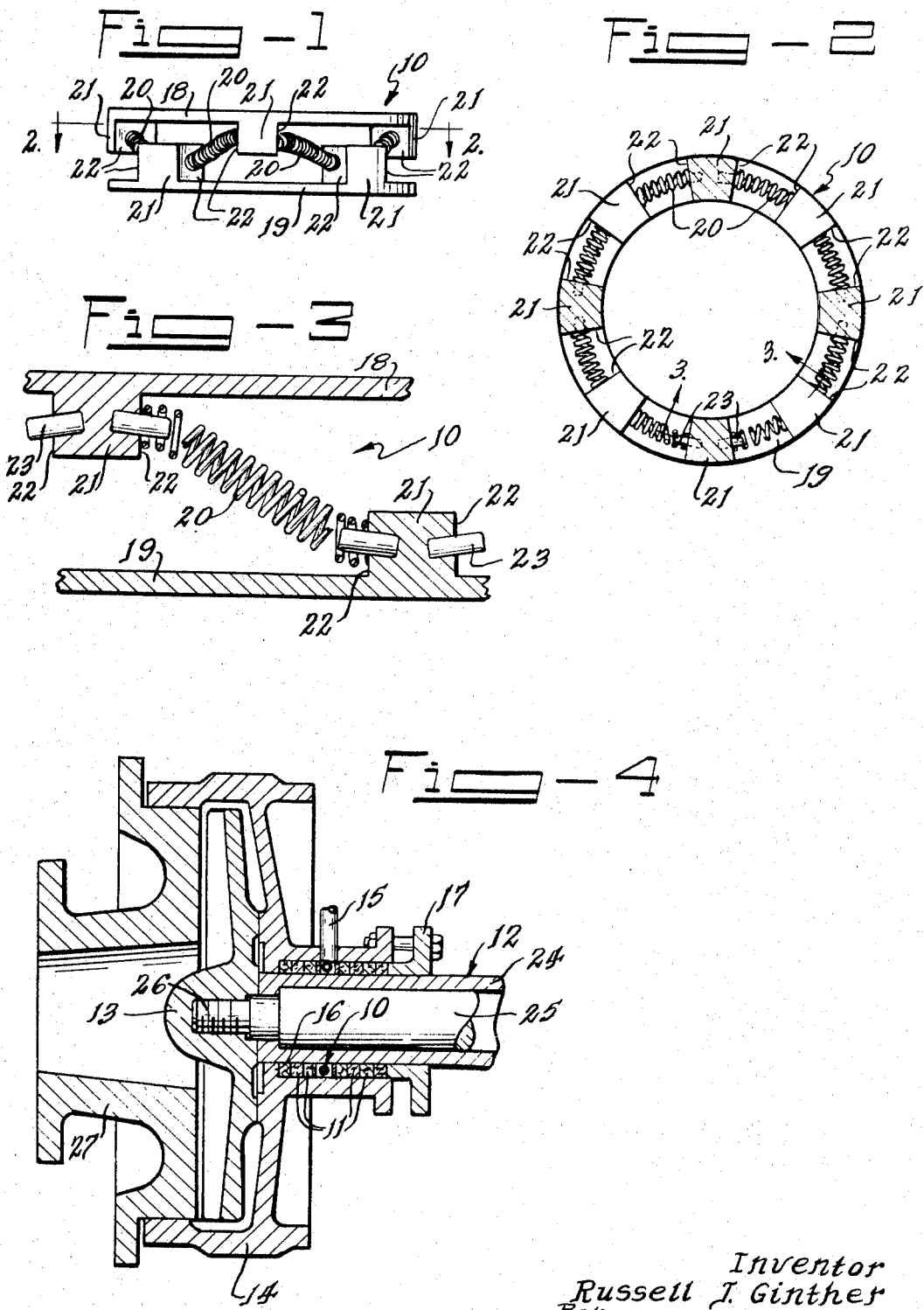

3,415,527
CAGE FOR COMPRESSING PACKING MEMBERS
Russell Joseph Ginther, Creve Coeur, Mo., assignor, by mesne assignments, to the United States of America as represented by the United States Atomic Energy Commission
Filed Feb. 6, 1967, Ser. No. 614,781
5 Claims. (Cl. 277—62)

ABSTRACT OF THE DISCLOSURE

A cage for compressing annular packing members, the cage comprising a pair of rings and circumferentially extending springs. The packing members seal the driving shaft of a water pump. The cage is located in the midst of the packing members and at the region of the pumping casing to which a lubricant line is connected, so that lubricant passes from the line through the cage to the pump shaft.

Contractual origin of the invention

The invention described herein was made in the course of, or under, a contract with the United States Atomic Energy Commission.

Background of the invention

This invention relates to the sealing of a rotating shaft by means of annular packing members. More particularly, the invention relates to use of a spring force for axially compressing such annular packing members.

When stationary annular packing members seal a rotating shaft by being in contact therewith, there must be some compensation for the frictional wear of the packing members in order to prevent leakage. It is known to compensate for such wear by axially compressing the packing members, and this may be accomplished by adjustment of a gland acting against the packing members. With this arrangement it may be inconvenient to carry out frequent adjustment of the gland, for otherwise considerable leakage will occur. It is also known to use a spring or springs extending axially of the shaft for axially compressing the packing members at all times in order thus to compensate for wear of the packing members as it occurs. The difficulty with an axially extending spring is that it must be relaitvely long and thus takes up too much space if it is to act with relatively constant force against the packing members as it expands with appreciable decrease in the over-all axial dimension of the packing members resulting from signficant frictional wear of the packing members against the rotating shaft.

Summary of the invention

The cage of the present invention overcomes the aforesaid difficulties in being of relatively short axial length and yet in acting with relatively constant force at the various conditions of expansion of the cage. The present cage employs springs extending substantially circumferentially between rings and yet acting axially against the rings to separate them. As the separation of the rings increases and the springs expand, they act in an increasingly axial direction to compensate for decrease in spring force due to expansion.

Brief description of the drawing

FIG. 1 is a side view of the seal cage of the present invention;
FIG. 2 is a sectional end view of the cage taken on the line 2—2 of FIG. 1;
FIG. 3 is a fragmentary sectional view taken on the line 3—3 of FIG. 2 and showing the mounting of a spring on the rings of the cage; and FIG. 4 is a longitudinal sectional view of a pump to which the cage is applied.

Description of the preferred embodiment

As shown in FIG. 4, a cage 10 of the present invention is employed with a plurality of annular packing members 11 to seal a rotating shaft 12 for a pump impeller 13 in a stationary casing 14 and to form a path through which lubricant is supplied to the shaft 12 by a line 15 connected to the casing 14. The packing members 11 surround the shaft 12 and lie within the casing 14. They are engaged at one end by an internal shoulder 16 of the casing 14 and at the other end by a gland 17, which is adjustably fastened to the casing.

The cage 10, which is formed to two rings 18 and 19 and a plurality of springs 20, as shown in FIGS. 1 and 2, resiliently compresses the packing members 11 axially, as shown in FIG. 4. Thus, as the interiors of the packing members 11 wear from being rubbed by the rotating shaft 12, they are kept in sealing contact with the shaft by the axial force exerted on the packing members because of the tendency of the springs 20 to move the rings 18 and 19 apart and decrease the axial dimension of the packing members.

As shown in FIGS. 1, 2, and 3, each of rings 18 and 19 has on its side facing the other ring, a plurality of short posts 21, which are four in number in the example illustrated in the present application. Each post 21 has two opposite sides 22 which are radial with respect to the ring of which the post forms a part. A projection 23, which is in the form of a pin set into the post 21, extends from each of the opposite sides 22 generally circumferentially of the associated ring 18 or 19 toward the other ring at a slight angle to the plane of the ring 18 or 19, that is, a plane perpendicular to the axis of the ring.

The posts 21 of each of the rings 18 and 19 are distributed about the ring with equal circumferential spacing. Each post 21 of each of rings 18 and 19 lies between two adjacent posts 21 of the other ring. Thus, the middle post 21 of ring 18 as appearing in FIG. 1 lies between the two adjacent posts 21 of ring 19 as appearing in FIG. 1; the right side 22 of middle post 21 of ring 18 faces the left side 22 of right-hand post 21 of ring 19; and the left side of middle post 21 of ring 18 faces the right side 22 of left-hand post 21 of ring 19. Similarly, entirely about rings 18 and 19, the right face of each post 21 of one of the rings 18 and 19 faces the left face of the adjacent post 21 of the other of the rings 18 and 19. There are eight sets of facing sides 22 of the posts 21 of the rings 18 and 19, and there are eight springs 20 extending between the facing sides 22, one spring to a set of facing sides. Each spring 20 is in the form of a coil the ends of which internally engage the projections.

Although the springs 20 extend circumferentially of the rings 18 and 19, they do not rotate one ring with respect to the other, because the springs act in circumferential opposition to one another. Thus, as to the two springs 20 associated with each post 21 of each of rings 18 and 19, one spring 20 tends to rotate one ring clockwise with respect to the other, and the other spring 20 tends to rotate the said one ring 20 counterclockwise with respect to the other.

Because each projection 23 is angled slightly out of the plane of the associated ring toward the other ring, there cannot be a dead-center position as the rings 18 and 19 are moved together from the position of FIG. 3, and the springs 20 always urge the rings 18 and 19 apart. As the rings 18 and 19 move apart, each spring 20 tends to become S-shaped, that is, the portion of the spring 20 free of the projections 23 assumes a greater angle to the planes of the rings 18 and 19. The increase in this angle compensates for the tendency of the force moving the rings 18 and 19 to decrease as they move apart. The net effect is that the separation force stays relatively constant as the over-all axial dimension of the packing members 11 decreases with internal wear of the packing members by the shaft 12 and the axial width of the cage 10 increases.

The important thing about the cage 10 is that it acts with great axial force on the packing members 11 and yet has a relatively small axial dimension. Thus for a given space for packing members between the internal shoulder 16 and the gland 17, there is a greater space for packing members 11 than could be the case if the packing members were axially compressed by axially extending springs. The cage 10 of the present invention is relatively thin axially, because the springs 20 extend essentially circumferentially, rather than axially.

As shown in FIG. 4, the shaft 12 comprises an outer sleeve 24 and a rod 25 tightly fitting therein. The sleeve 24 engages the packing members 11, and the rod 25 has a reduced threaded extension 26, which is located beyond the end of the sleeve 24 in threaded engagement with the impeller 13. The rod 25 is screwed into the impeller 13 to bring it up tight against the end of the sleeve 24, so that the shaft 12 is fixed to, and rotates, the impeller 13. Leftward movement of the rod 25 with respect to the sleeve 24 is limited by engagement of an internal shoulder on the sleeve 24 with an external shoulder on the rod 25. The casing 14 carries a casing cover 27 through which water being pumped is drawn to the impeller 13 and moved radially outward over the impeller and exits from the casing 14 at a region (not shown) near the periphery of the impeller. The shaft 12 is lubricated by water or other lubricant supplied through the line 15 and the cage 10.

The present cage 10 was employed successfully with annular packing member 11 in a water pump like the one illustrated in FIG. 4. The cage 10 as built used rings 18 and 19, which had a thickness of .09375", an inner diameter of 1.895", an outer diameter of 2.620". The posts 21 had a height of .250" and a width of .4375" at the outside of the rings 18 and 19. The projections 23 protruded .125" from the posts 21 and had a diameter of .125". The axes of the projections 23 were .125" from the tops of the posts 21 at the sides 22 of the posts 21. The springs 20 had an inner diameter of .137", an outer diameter of .205", and a free length of .875".

It is understood that the invention is not to be limited by the details given herein but that it may be modified within the scope of the appended claims.

The embodiments of the invention in which an exclusive property or privilege is claimed are defined as follows:

1. A cage for compressing annular packing members, comprising
    (a) two rings each having a plurality of short posts extending from one side of the ring and being distributed about the ring, the number of posts of one ring being equal to that of the posts of the other ring,
        each post having two projections extending in opposite directions generally circumferentially of the ring from two opposite sides of the post, the two rings being axially aligned, the posts of each ring extending toward the other ring, each post of each ring lying between two posts of the other ring, one of the said two opposite sides of each post of one ring facing one of the said opposite sides of one of the other ring's two posts between which the said post of the said one ring lies, the other of the said two opposite sides of the said each post of the said one ring facing one of the said opposite sides of the other of the other ring's two posts between which the said each post of the said one ring lies, and
    (b) a plurality of coil springs equal in number to the posts of the two rings, each spring extending from one of the opposite sides of a post of one ring to the facing one of the opposite sides of a post of the other ring, and having its ends internally engaging the projections on the two sides in question.

2. The cage specified in claim 1, the posts of each ring having equal circumferential spacing, the projections of each post of each ring extending from the post toward the other ring at a slight angle to the plane of said each ring.

3. The cage specified in claim 2, the said opposite sides of the posts of each ring before radial with respect to the ring, the posts of each ring being four in number.

4. An assembly comprising a plurality of axially aligned annular packing members, and a cage located in the midst of the packing members for compressing them axially, the cage comprising two facing, axially aligned rings having on their facing sides a plurality of posts, the posts of each ring being distributed thereabout and alternating with the posts of the other ring in circumferentially spaced relation thereto, a plurality of springs distributed about the rings and extending circumferentially thereof, each spring acting between a post on one ring and an adjacent post on the other ring for urging the rings axially away from one another.

5. The assembly specified in claim 4 and further comprising a rotating shaft extending through the packing members in sealing relation therewith and through the cage, a stationary casing containing the packing members and the cage, and a lubricant line connected to the casing at the cage for supplying lubricant through the cage to the shaft.

References Cited

UNITED STATES PATENTS

| | | | |
|---|---|---|---|
| 1,567,952 | 12/1925 | James | 277—151 |
| 2,041,586 | 5/1936 | Barzen | 277—62 XR |
| 2,538,987 | 1/1951 | Synek | 277—61 |
| 2,958,564 | 11/1960 | Ramirez | 277—62 |

LAVERNE D. GEIGER, *Primary Examiner.*

BRADFORD KILE, *Assistant Examiner.*

U.S. Cl. X.R.

277—059